US005942153A

United States Patent [19]

Heydel

[11] Patent Number: 5,942,153

[45] **Date of Patent: *Aug. 24, 1999**

[54] STABLE FRAGRANCES FOR BLEACHING COMPOUNDS

[75] Inventor: Jochen Heydel, Mahwah, N.J.

[73] Assignee: Bush Boake Allen Inc., Montvale, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,532

[22] Filed: Apr. 28, 1997

Related U.S. Application Data

[60] Provisional application No. 60/023,927, Aug. 14, 1996.

[51] Int. Cl.[6] ............................ C01B 11/00; C01B 11/10; C01B 15/00; C11D 3/50; C11D 7/54

[52] U.S. Cl. .................................. 252/187.33; 252/187.1; 252/187.21; 252/187.23; 252/187.24; 252/186.42; 252/186.43; 510/101

[58] Field of Search ......................... 252/186.42, 186.43, 252/187.1, 187.21, 187.22, 187.23, 187.24, 187.31, 187.32, 187.33, 187.34; 510/101

[56] References Cited

U.S. PATENT DOCUMENTS

| | | | |
|---|---|---|---|
| 4,579,677 | 4/1986 | Hooper et al. | 252/187.26 |
| 4,663,068 | 5/1987 | Hagemann et al. . | |
| 5,248,434 | 9/1993 | Nicholson . | |
| 5,451,346 | 9/1995 | Amou et al. | 252/186.23 |

*Primary Examiner*—Joseph D. Anthony
*Attorney, Agent, or Firm*—Richard R. Muccino

[57] ABSTRACT

The present invention is directed to a stable fragrant bleaching composition which comprises (a) a bleaching agent having a reduction potential from about −0.7 v to about +0.4 v; and (b) an organoleptic effective amount of a fragrant agent which is (i) stable to the bleaching agent; (ii) does not decompose the bleaching agent; and (iii) is not substantially hygroscopic. This invention also pertains to methods for making and employing the stable fragranced bleaching compounds.

27 Claims, No Drawings

STABLE FRAGRANCES FOR BLEACHING COMPOUNDS

This application is a Provisional application of No. 60/023,927 filed Aug. 14, 1996, now abandoned.

FIELD OF THE INVENTION

The present invention is directed to bleaching compositions containing a stable fragrant agent. The stable fragrant bleaching composition comprises (a) a bleaching agent having a reduction potential from about −0.7 v to about +0.4 v compared to an Ag/AgCl electrode; and (b) an organoleptic effective amount of a fragrant agent which is (i) stable to the bleaching agent; (ii) does not decompose the bleaching agent; and (iii) is not substantially hygroscopic. This invention also pertains to methods for making and employing the stable fragranced bleaching compounds.

DESCRIPTION OF THE BACKGROUND

Odor is that property of a substance that makes it perceptible to the sense of smell. Specifically, odor is that property that is manifested by a physiological sensation caused by contact of the molecules of a substance with the olfactory nervous system. Although molecular structure is believed to influence odor, there is little correlation, at the present time, between odor and molecular structure.

Odor modification is the intentional change of one odor by the addition of another. The importance of odor modification is its usefulness as a method of odor control. Air fresheners, perfumes, and industrial deodorants are examples of odor modifiers. Perfumers employ the principles of odor modification by creating fragrances. Thus, odor modification refers specifically to the use of fragrance materials for odor control. Many odorous and nonodorous chemicals are used to control odors, but only those that work essentially by altering the way the nose perceives the character and intensity are true odor modifiers.

A problem in the field of odor modification is in the area of perfuming bleaching compositions. Because of the inherent ability of a bleaching agent to destroy odors, it is difficult to effectively perfume a bleaching composition so that the perfume remains stable during storage and is available for effective delivery without being altered or destroyed by the bleach.

Bleaching agents are materials that lighten or whiten a substrate through chemical action. This action can involve either oxidative or reductive processes that make color bodies in the substrate more soluble and more easily removed during processing. The color producing agents in fibers are often organic compounds that contain conjugated chains, that is, alternating single and double bonds, called chromophores. Decolorization often can be achieved by destroying one or more of the double bonds in the conjugated systems such as by adding to, or cleaving, the double bond.

Bleaching agents can be classified into three catagories: chlorine containing bleaching agents, peroxygen compounds, and reducing bleaches. Three classes of chlorine-containing compounds used as bleaching agents are: chlorine, hypochlorites and N-chloro compounds, and chlorite and chlorine dioxide. The first two classes, termed available-chlorine compounds, produce hypochlorous acid and hypochlorite anion in bleaching baths. Peroxygen or active oxygen compounds contain a peroxide linkage (—O—O—) in which one oxygen atom is active, such as hydrogen peroxide. The reducing agents generally used in bleaching include sulfur dioxide, sulfurous acid, bisulfites, sulfites, hydrosulfites (dithionites), sodium formaldehyde sulfoxylate, and sodium borohydride.

U.S. Pat. No. 4,663,068 (Hagemann et al.) discloses a bleach-stable deodorant perfume stable in the presence of sodium perborate tetrahydrate and N,N,N',N'-tetraacetyl ethylenediamine. Specifically, Hagemann et al. discloses a detergent powder product suitable for use in the washing of fabrics which comprises (i) from 5 to 40% by weight of non-soap detergent active compound comprising an anionic detergent active compound; (ii) from 1 to 90% by weight of a non-soap detergency builder; (iii) from 1 to 30% by weight of peroxy bleach compound together with an activator; (iv) from 0.1 to 5% by weight of a bleach-stable perfume which comprises from 50 to 100% by weight of bleach-stable deodorant perfume components having a Lipoxidase-Inhibiting Capacity of at least 50% or a Raoult Variance Ratio of at least 1.1. The components are allocated to one of the following six classes: Class 1: Phenolic substances; Class 2: Essential oils, extracts, resins and synthetic oils; Class 3 Aldehydes and ketones; Class 4: Nitrogen-containing compounds; Class 5: Esters; Class 6: Alcohols and ethers. The components are selected so that: (a) the bleach-stable deodorant perfume contains at least five different components; and (b) the bleach-stable deodorant perfume contains components from at least four of the six classes.

U.S. Pat. No. 4,579,677 (Hooper et al.) discloses a deodorant product having a deodorant value of from 0.50 to 3.5 as measured by the Deodorant Value Test. Specifically, Hooper et al. discloses a deodorant product suitable for application to surfaces other than human skin, which product comprises (i) from 0.1 to 50% by weight of a bleaching agent; and (ii) from 0.1 to 20% by weight of a deodorant composition comprising from 45 to 100% by weight of deodorant active components, the components having a Lipoxidase-Inhibiting Capacity of at least 50% or a Raoult Variance Ratio of at least 1.1. The components are classified into the following six classes: Class 1: phenolic substances; Class 2: essential oils, extracts, resins and synthetic oils; Class 3: aldehydes and ketones; Class 4: polycyclic compounds; Class 5: esters; Class 6: alcohols. The components are selected so that (a) the deodorant composition contains at least five components of which at least one must be selected from each of Class 1, Class 2 and Class 4; and (b) the deodorant composition contains components from at least 4 of the 6 classes.

SUMMARY OF THE INVENTION

The present invention is directed to a stable, fragrant bleaching composition which comprises:

(a) a bleaching agent having a reduction potential from about −0.7 v to about +0.4 v compared to an Ag/AgCl electrode; and (b) an organoleptic effective amount of a fragrant agent which is (i) stable to the bleaching agent; (ii) does not decompose the bleaching agent; and (iii) is not substantially hygroscopic.

This invention also pertains to methods for making and employing the stable fragranced bleaching compounds.

DETAILED DESCRIPTION OF THE INVENTION

In accord with the present invention, applicants have discovered that stable, fragrant bleaching compositions can be prepared having improved properties over conventional bleaching compositions. The bleaching compositions comprise a bleaching agent having a reduction potential from about −0.7 v to about +0.4 v compared to an Ag/AgCl electrode, and a fragrant agent which (i) must be stable to the bleaching agent; (ii) must not decompose the bleaching agent; and (iii) must not be hygroscopic. The stable, fragrant bleaching compositions can be prepared using a wide variety of components. This invention also pertains to methods for making and employing the stable, fragrant bleaching compounds.

The following terms are used throughout the specification and are defined as follows unless otherwise indicated.

The term "halogen", as used herein, refers to the chemically related elements consisting of chlorine and bromine.

The term "lower-alkyl", as used herein, means branched- or unbranched-hydrocarbon radicals containing from 1 to 12 carbon atoms, preferably from 1 to 6 carbon atoms. Non-limiting examples of branched and unbranched lower-alkyl groups having from 1 to 12 carbon atoms are methyl, ethyl, n-propyl, i-propyl, n-butyl, sec-butyl, tert-butyl, n-pentyl, sec-pentyl, tert-pentyl, and the like.

The terms "odor", "fragrance", and "smell", as used herein, are used interchangeably whenever a compound is referred to as an organoleptic which is intended to stimulate the sense of smell.

The term "organoleptic", as used herein, refers to compounds of the invention which stimulate the sense of smell, and are thus perceived as having a characteristic odor.

The term "organoleptic effective amount", as used herein, means a level or amount of a fragrant agent(s) present in a composition at which the incorporated agent(s) exhibit(s) a sensory effect.

The term "not substantially hygroscopic", as used herein, refers to a compound, such as a fragrant agent, which does not have the property of adsorbing substantial moisture from the air. The fragrant agents of the present invention which are not substantially hygroscopic and do not adsorb substantial moisture from the air may adsorb up to about 3%, preferably up to about 2%, more preferably up to about 1%, and most preferably up to about 0.5%, by weight.

The bleaching agents which may be employed in the present invention may be selected from a wide variety of compounds. Suitable bleaching agents which may be employed have a reduction potential from about −0.7 v to about +0.4 v, preferably from about −0.4 v to about +0.2 v, more preferably from about −0.2 v to about +0.1 v, and most preferably about −0.2 v, compared to an Ag/AgCl reference electrode. Preferably, the bleaching agent is selected from the group consisting of chlorine containing bleaching agents, peroxygen compounds, and reducing bleaches. The chlorine-containing bleaching compounds may be selected from the group consisting of chlorine, hypochlorites and N-chloro compounds, and chlorite and chlorine dioxide.

In a preferred embodiment, the bleaching agent is a halogenated hydantoin (halohydantoin). The structure of some typical halogenated hydantoins is set out below.

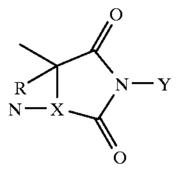

| | X | Y |
|---|---|---|
| 1,3-Dichloro-5,5-dimethylhydantoin (DCDMH) | Cl | Cl |
| 1-Bromo-3-chloro-5,5-dimethylhydantoin (BCDMH) | Br | Cl |
| 1,3-Dibromo-5,5-dimethylhydantoin (DBDMH) | Br | Br |
| where R is methyl. | | |

Halogenated hydantoins include, but are not limited to, N-monohalogenated hydantoins such as N-chloro-5,5-dimethylhydantoin (MCDMH) and N-bromo-5,5-dimethyhydantoin (MBDMH), and dihalogenated hydantoins such as 1,3-dichloro-5,5-dimethylhydantoin (DCDMH), 1,3-dibromo-5,5-dimethylhydantoin (DBDMH), and 1-bromo-3-chloro-5,5-dimethylhydantoin (BCDMH). Halogenated methyl ethylhydantoins may also be employed such as N-chloro-5-methyl-5-ethylhydantoin (MCMEH), 1,3-dichloro-5-methyl-5-ethylhydantoin (DCMEH), N-bromo-5-methyl-5-ethylhydantoin (MBMEH), 1,3-dibromo-5-methyl-5-ethylhydantoin (DBMEH), and 1-bromo-3-chloro-5-methyl-5-ethylhydantoin (BCMEH). Alkyl substitution is not limited to methyl and ethyl but also includes lower-alkyl mixtures of C1 to C12 isomers. Preferably, the bleaching agent is selected from the group consisting of 1,3-dichloro-5,5-dimethylhydantoin and 1-bromo-3-chloro-5,5-dimethylhydantoin, and more preferably the bleaching agent is 1,3-dichloro-5,5-dimethylhydantoin.

The term "reduction" refers to a chemical reaction in which hydrogen combines with another substance or in which oxygen is removed from a substance. More generally, the term "reduction" refers to a chemical change in which the valence state of an atom of an element is decreased as a result of the gain of one or more electrons. The standard hydrogen electrode provides the reference for all oxidation-reduction systems. The hydrogen half-cell or hydrogen electrode is defined as set out below.

$$H^+(aq)+e=\tfrac{1}{2}H_2(g)$$

By definition, the potential of this system is zero ($E^0$=0.000V) at all temperatures when an inert metallic electrode dips into a solution of hydrogen ions of unit activity, i.e., pH =0, in equilibrium with hydrogen gas at one atmosphere pressure. The potential of all other electrodes are then referred to this defined zero. The absolute potential of other electrodes may be either greater or smaller, and thus may be positive or negative relative to the potential of the standard hydrogen electrode.

The reduction potential of some typical halogenated hydantoins is set out below.

| Halogenated Hydantoin | Cyclic Voltammetry (CV) peak potentials: |
|---|---|
| Bromodimethyhydantoin (MBDMH) | +0.2 v |
| Chlorodimethylhydantoin (MCDMH) | −0.7 v |

-continued

| Halogenated Hydantoin | Cyclic Voltammetry (CV) peak potentials: |
|---|---|
| Dibromodimethylhydantoin (DBDMH) | +0.1 v, +0.4 v |
| Dichlorodimethylhydantoin (DCDMH) | −0.2 v |

Reference literature electrode is Ag/AgCl; Reference literature reports $Cl_2$ as +1.36 v and $Br_2$ as +1.08 v.

Other brominated and chlorinated oxidizing materials include, but are not limited to, the alkali metal salts of dihalocyanurates, such as sodium dichloroisocyanurate, trichlorocyanuric acid, various halogenated glycolurils, and halogenated aromatic sulfonamides such as chloramine T, chloramine B, and halogenated sulfamates.

A particularly preferred bleaching agent is DANTOCHLOR® RW, 1,3-dichloro-5,5-dimethylhydantoin. DANTOCHLOR® RW is used as an aid in the control of bacterial, fungal, and algal slimes in evaporative condensers, recirculating cooling tower systems, influent systems such as flow through filters, lagoons, industrial wet scrubber systems, and brewery pasteurizers. DANTOCHLOR® RW is also used as an antimicrobial for pulp and for the manufacture of non-food grades of paper and paperboard and for enhanced oil recovery. DANTOCHLOR® RW is a proprietary hydantoin derivative in briquette form and functions as a microbiocide through the controlled release of active chlorine. The chemical composition, physical properties, and solution properties of DANTOCHLOR® RW are set out below.

| DANTOCHLOR ® RW | |
|---|---|
| Chemical Composition | |
| 1,3-Dichloro-5,5-dimethylhydantoin | 86.0% |
| 1,3-Dichloro-5-ethyl-5-methylhydantoin | 3.0% |
| Other related compounds | 10.0% |
| Inert Ingredients | 1.0% |
| Physical Properties | |
| Color | White |
| Total Available Chlorine, % | 68.0 |
| Active Chlorine, % | 34.0 Min. |
| Odor | Slight Halogen |
| Briquette Wt. (g) | 12 |
| Briquette Density ($g/cm^3$) | 1.6 |
| Briquette Bulk Density ($lb/ft^3$) | 65.0 |
| Nominal Briquette Dimensions (cm) | 4.2 × 2.2 × 1.3 |
| Melting Range, powder, (° C.) | 106–130 |
| pH, (1% Slurry at 25° C.) | 3.4 |
| Decomposition Temperature (° C.) | 180.0 |
| Volatiles, % | 0.5 Max. |
| $CHCl_3$ Insolubles, % | 0.5 Max. |
| Solution Properties | |
| Solubility in Water (g/100 g at 25° C.) | 0.43 |
| Total Insolubles, % | Nil |
| Physical Stability in Water | Stable |
| Odor in Solution | Slight Chlorine |
| Moisture Retention, % (6 hour soak in water at 25° C.) | 3 |

The fragrant agents which may be employed in the present invention may be selected from a wide variety of compounds. Suitable fragrant agents which may be employed (i) are stable to the bleaching agent; (ii) do not decompose the bleaching agent; and (iii) is not substantially hygroscopic. Fragrant agents which are considered to be stable to the bleaching agent and do not decompose the bleaching agent are those fragrant agents which have an odor value of "C" or better as defined in Table 1. In another embodiment, fragrant agents which are considered to be stable to the bleaching agent and do not decompose the bleaching agent are those fragrant agents which have an odor value of "B" or better as defined in Table 1.

In a preferred embodiment, the fragrant agent is stable to the bleaching agent; (ii) does not decompose the bleaching agent; and (iii) is not substantially hygroscopic, with the proviso that the fragrant agent is not an essential oil, extract, resin, or synthetic oil. In another preferred embodiment, the fragrant agent is stable to the bleaching agent; (ii) does riot decompose the bleaching agent; and (iii) is not substantially hygroscopic, with the proviso that the fragrant agent is not a polycyclic compound.

Preferably, the fragrant agent has an odor value of C or better. More preferably, the fragrant agent has an odor value of C or better and is selected from the group consisting of Isoamyl phenyl ether (commercially available under the trade name "Anther" from PPF Norda, East Hanover, N.J.), Isoborneol, Isoborneol methyl ether, 2,2-dimethylbicyclo [2.2.1]heptane-3-carboxylic acid, methyl ester (commercially available under the trade name "Cistulate" from Naarden International, New York, N.Y.), 2-Tertiary pentyl cyclohexanyl acetate (commercially available under the trade name "Coniferan" from International Fragrances & Flavors, Union Beach, N.J.), 7-Octen-2-ol-2,6-dimethyl acetate (commercially available under the trade name "Dihydro Myrcenyl Acetate" from Quest International Fragances Company, Mount Olive, N.J.), 1-Methyl-4-isopropyl cyclohexan-8-yl acetate (commercially available under the trade name "Dihydro Terpinyl Acetate" from International Fragrances & Flavors, Union Beach, N.J.), Tetrahydrogeraniol, 2,6-dimethylheptan-2-ol (commercially available under the trade name "Dimetol" from Givaudan, Clifton, N.J.), Diphenyl methane (commercially available from Elan Chemical Company Incorporated, Newark, N.J.), Diphenyl oxide (Diphenyl Ether, commercially available from Polarome Manufacturing Company, Incorporated, Jersey City, N.J.), Eucalyptol (commercially available from Ungerer & Company, Lincoln Park, N.J.), alpha-Fenchyl acetate (commercially available from Citrus & Allied Essences Ltd., Floral Park, N.J.), 1,3-Dioxane-2,4,6-trimethyl-4-phenyl (commercially available under the trade name "Floropal" from Haarmann & Reimer Corp., Springfield, N.J.), 4-Methyl-2-(2-methylpropyl)tetrahydro-2H-pyran-4-ol (commercially available under the trade name "Florosa (Q)" from Quest International Fragances Company, Mount Olive, N.J.), Ethyl tricyclo[5.2.1.02,6] decan-2-carboxylate (commercially available under the trade name "Fruitate" from KAO Corporation, Tokyo, Japan), 2-Methyldecanonitrile (commercially available under the trade name "Frutonile" from Quest International Fragances Company, Mount Olive, N.J.), 2-Butyl-4,4,6-trimethyl-1,3-dioxane (commercially available under the trade name "Herboxane" from Quest International Fragances Company, Mount Olive, N.J.), 2-Butyl-4,4,6-trimethyl-1,3-dioxane (commercially available from Roure Betrand Dupont, Inc., Teaneck, N.J.), Limetol (commercially available from Quest International Fragances Company, Mount Olive, N.J.), 3,12-Tridecadiene nitrile (commercially available under the trade name "Mandaril" from Haarmann & Reimer Corp., Springfield, N.J.), Methyl lavender ketone (commercially available from International Fragrances & Flavors, Union Beach, N.J.), Octanal dimethyl acetal (commercially available under the trade name "Octacetal" from International Fragrances & Flavors, Union Beach, N.J.), Orange flower ether (commercially available from International Fragrances & Flavors, Union Beach, N.J.), p-Tertiary butyl cyclohexanol (commercially available under the trade name "Patchone" from International Fragrances & Flavors, Union Beach, N.J.), Benzene pentanol, Gamma-Methyl (commercially available under the trade name "Phenoxanol" from International Fragrances & Flavors, Union Beach, N.J.), 3-Octanol (commercially available under the trade name "Tetrahydroalloocimenol" from Union Camp Corporation, Jacksonville, Fla.), 3,7-Dimethyl-3-octanol (commercially available under the trade name "Tetrahydrolinalool" from Givaudan, Clifton, N.J.), :2,6-Dimethyl-2-octanol (commercially available under the trade name "Tetrahydromyrcenol" from SCM Glidco Organics Corp., Jacksonville, Fla.), Thymyl methyl ether, ortho-Tertiary butyl cyclohexanyl acetate (commercially available under the trade name "Verdox" from International Fragrances & Flavors, Union Beach, N.J.), Benzene, [2-(1-Ethoxyethoxy) ethyl-1-ethoxy-1-(2-phenylethoxy)ethane] (commercially available under the trade name "Vertocinth" from Bush Boake Allen Inc., Montvale, N.J.), Cyclohexyl phenyl ethyl ether (commercially available under the trade name "Phenafleur" from International Fragrances & Flavors, Union Beach, N.J.), 1-(4-Isopropylcyclohexyl)ethanol (commercially available under the trade name "Mugetanol" from Haarmann & Reimer Corp., Springfield, N.J.), and Bicyclo[2.2.1]heptane-2-ethyl-5(or 6)-methoxytricyclo [2.2.1.0.2.6]heptane, 1-ethyl-3-methoxy (commercially available under the trade name "Neoproxen" from International Fragrances & Flavors, Union Beach, N.J.).

More preferably, the fragrant agent comprises a mixture of two members selected from the group consisting of Iso amyl phenyl ether, Isoborneol, Isoborneol methyl ether, 2,2-Dimethylbicyclo[2.2.1]heptane-3-carboxylic acid, methyl ester, 2-Tertiary pentyl cyclohexanyl acetate, 7-Octen-2-ol-2,6-dimethyl acetate, 1-Methyl-4-isopropyl Cyclohexan-8-yl acetate, Tetrahydrogeraniol, 2,6-Dimethylheptan-2-ol, Diphenyl methane, Diphenyl oxide, Eucalyptol, alpha-Fenchyl acetate, 1,3-Dioxane-2,4,6-trimethyl-4-phenyl, 4-Methyl-2-(2-methylpropyl) tetrahydro-2H-pyran-4-ol, Ethyl tricyclo[5.2.1.02,6]decan-2-carboxylate, 2-Methyldecanonitrile, 2-Butyl-4,4,6-trimethyl-1,3-dioxane, 2-Butyl-4,4,6-trimethyl-1,3-dioxane, Limetol, 3,12-Tridecadiene nitrile, Methyl lavender ketone, Octanal dimethyl acetal, Orange flower ether, p-Tertiary butyl cyclohexanol, Benzene pentanol, gamma-Methyl, 3-octanol, 3,7-Dimethyl-3-octanol, 2,6-Dimethyl-2-octanol, Thymyl methyl ether, ortho-Tertiary butyl cyclohexanyl acetate, Benzene, [2-(1-ethoxyethoxy) ethyl-1-ethoxy-1-(2-phenylethoxy)ethane, Cyclohexyl phenyl ethyl ether, 1-(4-isopropylcyclohexyl)ethanol, and Bicyclo[2.2.1]heptane-2-ethyl-5(or 6)methoxytricyclo[2.2.1.0.2.6]heptane, 1-ethyl-3-methoxy, wherein at least one member has an odor value of C or better.

Most preferably, the fragrant agent comprises a mixture of three members selected from the group consisting of Iso amyl phenyl ether, Isoborneol, Isoborneol Methyl ether, 2,2-Dimethylbicyclo[2.2.1]heptane-3-carboxylic acid, methyl ester, 2-Tertiary pentyl cyclohexanyl acetate, 7-Octen-2-ol-2,6-dimethyl acetate, 1-Methyl-4-isopropyl cyclohexan-8-yl acetate, Tetrahydrogeraniol, 2,6-Dimethylheptan-2-ol, Diphenyl methane, Diphenyl oxide, Eucalyptol, alpha-Fenchyl acetate, 1,3-Dioxane-2,4,6-trimethyl-4-phenyl, 4-Methyl-2-(2-methylpropyl) tetrahydro-2H-pyran-4-ol, Ethyl tricyclo[5.2.1.02,6]decan-2-carboxylate, 2-Methyldecanonitrile, 2-Butyl-4,4,6-trimethyl-1,3-dioxane, 2-Butyl-4,4,6-trimethyl-1,3-dioxane, Limetol, 3,12-Tridecadiene nitrile, Methyl lavender ketone, Octanal dimethyl acetal, Orange flower ether, p-Tertiary butyl cyclohexanol, Benzene pentanol, gamma-Methyl, 3-octanol, 3,7-Dimethyl-3-octanol, 2,6-Dimethyl-2-octanol, Thymyl methyl ether, ortho-Tertiary butyl cyclohexanyl acetate, Benzene, [2-(1-ethoxyethoxy) ethyl-1-ethoxy-1-(2-phenylethoxy)ethane, Cyclohexyl phenyl ethyl ether, 1-(4-isopropylcyclohexyl)ethanol, and Bicyclo[2.2.1]heptane-2-ethyl-5(or 6)-methoxytricyclo[2.2.1.0.2.6]heptane, 1-ethyl-3-methoxy, wherein at least one member has an odor value of C or better.

In a preferred embodiment, the fragrant agent has an odor value of B or better. More preferably, the fragrant agent has an odor value of B or better and is selected from the group consisting of Iso amyl phenyl ether, Isoborneol, Isoborneol methyl ether, 2,2-Dimethylbicyclo[2.2.1]heptane-3-carboxylic acid, methyl ester, 2-Tertiary pentyl cyclohexanyl acetate, 7-Octen-2-ol-2,6-dimethyl acetate, 1-Methyl-4-isopropyl cyclohexan-8-yl acetate, Tetrahydrogeraniol, 2,6-Dimethylheptan-2-ol, Diphenyl methane, Diphenyl oxide, Eucalyptol, alpha-Fenchyl acetate, 1,3-Dioxane-2,4,6-trimethyl-4-phenyl, 4-Methyl-2-(2-methylpropyl) tetrahydro-2H-pyran-4-ol, Ethyl tricyclo[5.2.1.02,6]decan-2-carboxylate, 2-Methyldecanonitrile, 2-Butyl-4,4,6-trimethyl-1,3-dioxane, 2-Butyl-4,4,6-trimethyl-1,3-dioxane, Limetol, 3,12-Tridecadiene nitrile, Methyl lavender ketone, Octanal dimethyl acetal, Orange flower ether, p-Tertiary butyl cyclohexanol, Benzene pentanol, gamma-Methyl, 3-octanol, 3,7-Dimethyl-3-octanol, 2,6-Dimethyl-2-octanol, Thymyl methyl ether, ortho-Tertiary butyl cyclohexanyl acetate, Benzene, [2-(1-ethoxyethoxy) ethyl-1-ethoxy-1-(2-phenylethoxy)ethane, Cyclohexyl phenyl ethyl ether, 1-(4-isopropylcyclohexyl)ethanol, and Bicyclo[2.2.1]heptane-2-ethyl-5(or 6)-methoxytricyclo[2.2.1.0.2.6]heptane, 1-ethyl-3-methoxy.

The fragrant agent may also comprise a diluent. Suitable diluents may be selected from the group consisting of Isopar L, Isopar M, and Isopar H. Preferably, the diluent is Isopar M. Isopar L, Isopar M, and Isopar H are clear, colorless, liquid, synthetic, isoparaffinic hydrocarbons which are commercially available from Exxon Chemical Company, Houston Tex.

In a preferred embodiment, the fragrant agent comprises a mixture (no. 1) of the following components in the proportions set out below:

| Ingredient Name | Quantity |
|---|---|
| 2,2-Dimethylbicyclo[2.2.1]heptane-3-carboxylic acid, methyl ester | 2 |
| 7-Octen-2-ol-2,6-dimethyl acetate | 100 |
| 1-Methyl-4-isopropyl cyclohexan-8-yl acetate | 300 |
| 2,6-Dimethylheptan-2-ol | 30 |
| Diphenyl oxide | 10 |
| Eucalyptol | 50 |
| *alpha*-Fenchyl acetate | 50 |
| 4-Methyl-2-(2-methylpropyl)tetrahydro-2H-pyran-4-ol | 25 |
| Ethyl tricyclo[5.2.1.02,6]decan-2-carboxylate | 2.5 |
| 2-Butyl-4,4,6-trimethyl-1,3-dioxane | 50 |
| Isoborneol | 3.5 |
| Isoborneol methyl ether | 25 |
| Isopar M | 50 |
| Methyl lavender ketone | 5 |
| Octanal dimethyl acetal | 7 |
| Tetrahydrogeraniol | 30 |
| 3,7-Dimethyl-3-octanol | 200 |
| *ortho*-Tertiary butyl cyclohexanyl acetate | 60 |
| Total | 1000 |

In another preferred embodiment, the fragrant agent comprises a mixture (no. 2) of the following components in the proportions set out below:

| Ingredient Name | Quantity |
|---|---|
| 7-Octen-2-ol-2,6-dimethyl acetate | 150 |
| 1-Methyl-4-isopropyl cyclohexan-8-yl acetate | 150 |
| Tetrahydrogeraniol, 2,6-dimethylheptan-2-ol | 150 |
| Diphenyl oxide | 15 |
| 1,3-Dioxane-2,4,6-trimethyl-4-phenyl | 25 |
| Ethyl tricyclo[5.2.1.02,6]decan-2-carboxylate | 18 |
| Limetol | 10 |
| Octanal dimethyl acetal | 10 |
| 2,6-Dimethyl-2-octanol | 400 |
| Thymyl methyl ether | 2 |
| *ortho*-Tertiary butyl cyclohexanyl acetate | 70 |
| Total | 1000 |

In another preferred embodiment, the fragrant agent comprises a mixture (no. 3) of the following components in the proportions set out below:

| Ingredient Name | Quantity |
|---|---|
| Iso amyl phenyl ether | 15 |
| 2,2-Dimethylbicyclo[2.2.1]heptane-3-carboxylic acid, methyl ester | 5 |
| 2-Tertiary pentyl cyclohexanyl acetate | 25 |
| 7-Octen-2-ol-2,6-dimethyl acetate | 400 |
| Diphenyl methane | 15 |
| Eucalyptol | 15 |
| *alpha*-Fenchyl acetate | 100 |
| Isobornyl methyl ether | 200 |
| 3,7-Dimethyl-3-octanol | 150 |
| *ortho*-Tertiary butyl cyclohexanyl acetate | 65 |
| [2-(1-Ethoxyethoxy) ethyl-1-ethoxy-1-(2-phenylethoxy)ethane | 10 |
| Total | 1000 |

In another preferred embodiment, the fragrant agent comprises a mixture (no. 4) of the following components in the proportions set out below:

| Ingredient Name | Quantity |
|---|---|
| Diphenyl Methane | 350 |
| Eucalyptol | 450 |
| Ethyl tricyclo[5.2.1.02,6]decan-2-carboxylate | 25 |
| Isopar M | 115 |
| Octanal dimethyl acetal | 25 |
| Tetrahydrogeraniol | 35 |
| Total | 1000 |

The amount of fragrant agent present in the stable fragrant bleaching compositions of the present invention is an organoleptic effective amount. An organoleptic effective amount of fragrant agent is that amount of fragrant agent necessary to exhibit a sensory effect and thereby mask or odor modify the bleaching agent in the bleaching composition. The exact amount of fragrant agent is a matter of preference subject to such factors as the type of fragrant agent and bleaching agent employed as well as the other ingredients present in the bleaching composition. In a preferred embodiment, the fragrant agent is present in the stable fragrant bleaching compositions in an amount from about 1% to about 10%, preferably from about 2% to about 8%, more preferably from about 4% to about 6%, and most preferably about 5%, by weight of the stable, fragrant bleaching composition.

Once prepared, the inventive stable fragrant bleaching compositions may be stored for future use or may be formulated in effective amounts with acceptable carriers to prepare a wide variety of fragrant compositions. Suitable carriers include sodium sulfate, and the like. Other ingredients will usually be incorporated into the composition as dictated by the nature of the desired composition as well known by those having ordinary skill in the art. The ultimate bleaching compositions are readily prepared using methods generally known in the chemical arts. Illustrative non-limiting additive categories and examples of formulating materials that may be employed in the stable fragrant bleaching compositions of the present invention include solubility modifiers (for example, sodium bicarbonate, aluminum hydroxide, magnesium oxide, barium hydroxide and sodium carbonate; see U.S. Pat. No. 4,537,697); compaction aids (for example, inorganic salts comprised of hydrogen, lithium, sodium, potassium, magnesium and calcium cations associated with carbonate, bicarbonate, borate, silicate, phosphate, precarbonate, and perphosphate; see U.S. Pat. No. 4,677,130); fillers (for example, inorganic salts such as combinations of lithium, sodium, potassium, magnesium and calcium cations with sulfate and chloride anions as well as other inorganics such as clays and zeolites); surfactants (for example, sodium dioctyl sulfosuccinate, disodium lauryl sulfosuccinate, sodium lauryl sulfoacetate and sodium cocoylisethionate); dyes (for example, copper phthalocyanine terasulfonic acid tetra sodium salt dye, derivitized and underivitized phthalocyanines such as Pigment Green 7, Pigment Blue 15, and Pigment Blue 86 as well as inorganic pigments such as lazurite); fragrances (for example, BBA-Pine Herbal); dispersants (for example, polyacrylic acid and secondary and tertiary polymers of the polyacrylic acid based dispersants and 2-phosphono-1,2,4-butanetricarboxylic acid tetra-Na salt, "BAYHIBIT™ S"); lubricants/mold release agents (for example, magnesium, calcium, and sodium stearate); binders (for example, ethylene-bis-stearamide, "ACRAWAX® C"); chelants (for example, sodium gluconate, ethylene diamine tetraacetic acid (EDTA), citric acid and sodium nitrilotriacetate (NTA)); stabilizers (for example, dimethyl hydantoin, N-hydrogen stabilizers such as 5,5-dimethyl hydantoin (DMH), 5,5-ethylmethyl hydantoin (EMH), cyanuric acid, sulfamic acid, urea, 4,4-dimethyl-2-oxazolidinome, sulfonamides (for example, benzene sulfonamide, p-toluene sulfonamide, and methane sulfonamide), sulfamates, glycoluril and succinimide), biocides (for example, copper sulfate, molybdates, selenates, tungstates, and chromates; see U.S. Pat. No. 4,995,987); bromide sources (for example, sodium bromide and potassium bromide); corrosion inhibitors (for example, sodium silicate and sodium benzoate); and oxidizing halogenated biocides (for example, bromochlor-5,5-dimethylhydantoin (BCDMH), halogenated hydantoins, chlorinated isocyanurates and other halogenated n-hydrogen compounds).

The present invention extends to methods for making and employing the stable, fragrant bleaching compositions. In general, a fragrant bleaching composition is made and employed by admixing an organoleptic effective amount of a fragrant agent with a bleaching agent and the other ingredients of the final desired bleaching composition.

The present invention is further illustrated by the following examples which are not intended to limit the effective scope of the claims. All parts and percentages in the examples and throughout the specification and claims are by weight of the final composition unless otherwise specified.

EXAMPLE I

This example illustrates a method for preparing a solid, stable, fragrant bleaching composition in tablet form containing a fragrant agent and a bleaching agent compound according to the present invention.

The formula for making a tablet of solid, stable, fragrant bleaching composition for testing is set out below:

| Component | % by weight. |
|---|---|
| 1. Precipitated silica | 2.00 |
| 2. Fragrance | 5.00 |
| 3. Dioctyl sodium sulfosuccinate | 4.00 |
| 4. Sodium sulfate | 4.00 |
| 5. Bleaching agent | 85.00 |
| Total | 100.00 |

All work preparing the solid, stable, fragrant bleaching composition was performed in a ventilating hood using protective gloves, a dust mask, and goggles. Components #1 and #2 were pre-mixed until a dry powder was formed. Components #3 through #5 were then added in order and mixed until uniform. A quantity of 10 grams of the above mixture was placed in a chrome plated dye set and then placed in a Carver Press where 20,000 psi was applied for 5 seconds. The pressure was relieved by loosening the hydraulic bleed valve. The tablet was then removed from the dye by inverting the dye and placing a flange between the dye and the press. The press was pumped until the tablet was released. The pressure was again released by loosening the hydraulic bleed valve and removing the dye and tablet. One 10 gm tablet was then placed in 500 ml of tap water and the odor was evaluated as described below.

A number of fragrances materials were tested in a block tablet, prepared as described above, at a 5.00% level, by weight, employing DANTOCHLOR® RW powder as the bleaching agent. Table 1, set out below, summarizes the results of the odor and color observations of the tablets after storage for two weeks, at room temperature, and at 110° F.

TABLE 1

| | 2 weeks Room Temperature | | 2 weeks 110° F. | |
|---|---|---|---|---|
| Component | Color | Odor | Color | Odor |
| No fragrance | 0 | A | 0 | B |
| Anther | 0 | B | 0 | C |
| Iso borneol | 0 | A | 0/+ | B |
| Iso borneol methyl ether | 0 | A/B | + | B |
| Cistulate | 0 | B | 0/+ | B/C |
| Coniferan | 0 | B | 0/+ | C |
| Dhydro myrenyl acetate | 0 | B | 0/+ | D |
| Dihydro terpinyl acetate | 0 | B | ++ | D |
| Tetrahydro geraniol | 0 | A/B | 0/+ | B |
| Dimetol | 0 | A | 0/+ | C |
| Diphenyl methane | 0 | A | 0/+ | B |
| Diphenyl oxide | ++ | B | +++ | C |
| Eucalyptol (1,8-Cineole) | 0 | A | 0 | B |
| Fenchyl acetate, alpha | 0 | A | 0 | C |
| Floropal | 0 | C | ++ | D |
| Florosa (QST-120) | 0 | B | + | C |
| Fruitate | 0 | A | 0/+ | B |
| Frutonile (QST-20) | 0 | A | ++ | C |
| Herboxane | 0 | B | ++ | D |
| Limetol (LRG 1182) | 0 | B | 0 | D |
| Mandaril | 0 | B | 0/+ | D |
| Methyl lavender ketone | 0 | B | 0/+ | D |
| Octacetal | 0 | A | 0 | B |
| Orange flower ether | 0 | B/C | 0 | D |
| Isopar M | 0 | A | 0 | A/B |
| Patchone | ++++ | N/S | N/S | N/S |
| Phenoxanol | + | C | ++ | D |
| Tetrahydro allo ocimenol | 0 | A/B | 0/+ | D |
| Tetrahydro linalool | 0 | B | 0/+ | D |
| Tetrahydro myrcenol | 0 | A/B | 0/+ | D |

TABLE 1-continued

| | 2 weeks Room Temperature | | 2 weeks 110° F. | |
|---|---|---|---|---|
| Component | Color | Odor | Color | Odor |
| Thymyl methyl ether | ++ | B | +++ | C |
| Verdox | 0 | B | 0 | C |
| Vertocinth (efetaal) | 0 | B | + | D |
| Phenafleur (IFF-121) | + | B | + | D |
| Mugetanol (HNR-50) | ++++ | N/S | N/S | N/S |
| Neoproxen (IFF-149) | 0 | B | 0/+ | 0 |

Color Stability
++++ = Severe intense discoloration
+++ = Considerable discoloration
++ = Moderate discoloration
+ = Slight discoloration
0 = Essentially no color change relative to unfragranced base
Odor Stability
A = Stable
B = Acceptably stable, slight change
C = Less stable, not disagreeable
D = Unstable, "off" note
Nß = No Sample due to reaction at room temperature Based on the observations set out in Table 1, fragrance mixtures no. 1 through 4 were prepared with the components, and in the proportions, set out below.

| Ingredient Name | Quantity |
|---|---|
| Fragrance Mixture no. 1., Lavanda Verde | |
| 2,2-Dimethylbicyclo[2.2.1]heptane-3-carboxylic acid, methyl ester | 2 |
| 7-Octen-2-ol-2,6-dimethyl acetate | 100 |
| 1-Methyl-4-isopropyl cyclohexan-8-yl acetate | 300 |
| 2,6-Dimethylheptan-2-ol | 30 |
| Diphenyl oxide | 10 |
| Eucalyptol | 50 |
| *alpha*-Fenchyl acetate | 50 |
| 4-Methyl-2-(2-methylpropyl)tetrahydro-2H-pyran-4-ol | 25 |
| Ethyl tricyclo[5.2.1.02,6]decan-2-carboxylate | 2.5 |
| 2-Butyl-4,4,6-trimethyl-1,3-dioxane | 50 |
| Isoborneol | 3.5 |
| Isoborneol methyl ether | 25 |
| Isopar M | 50 |
| Methyl lavender ketone | 5 |
| Octanal dimethyl acetal | 7 |
| Tetrahydrogeraniol | 30 |
| 3,7-Dimethyl-3-octanol | 200 |
| *ortho*-Tertiary butyl cyclohexanyl acetate | 60 |
| Total | 1000 |
| Fragrance Mixture no. 2, Herbal Citrus Bouquet | |
| 7-Octen-2-ol-2,6-dimethyl acetate | 150 |
| 1-Methyl-4-isopropyl cyclohexan-8-yl acetate | 150 |
| Tetrahydrogeraniol, 2,6-dimethylheptan-2-ol | 150 |
| Diphenyl oxide | 15 |
| 1,3-Dioxane-2,4,6-trimethyl-4-phenyl | 25 |
| Ethyl Tricyclo[5.2.1.02,6]decan-2-carboxylate | 18 |
| Limetol | 10 |
| Octanal dimethyl acetal | 10 |
| 2,6-Dimethyl-2-octanol | 400 |
| Thymyl methyl ether | 2 |
| *ortho*-Tertiary butyl cyclohexanyl acetate | 70 |
| Total | 1000 |
| Fragrance Mixture no. 3, Herbal Pine Bouquet | |
| Iso amyl phenyl ether | 15 |
| 2,2-Dimethylbicyclo[2.2.1]heptane-3-carboxylic acid, methyl ester | 5 |
| 2-Tertiary pentyl cyclohexanyl acetate | 25 |
| 7-Octen-2-ol-2,6-dimethyl acetate | 400 |

-continued

| Ingredient Name | Quantity |
|---|---|
| Diphenyl methane | 15 |
| Eucalyptol | 15 |
| *alpha*-Fenchyl acetate | 100 |
| Isobornyl methyl ether | 200 |
| 3,7-Dimethyl-3-octanol | 150 |
| *ortho*-Tertiary butyl cyclohexanyl acetate | 65 |
| [2-(1-Ethoxyethoxy) ethyl-1-ethoxy-1-(2-phenylethoxy)ethane | 10 |
| Total | 1000 |
| Fragrance Mixture no. 4, Lavender Bouquet | |
| Diphenyl methane | 350 |
| Eucalyptol | 450 |
| Ethyl tricyclo[5.2.1.02,6]decan-2-carboxylate | 25 |
| Isopar M | 115 |
| Octanal dimethyl acetal | 25 |
| Tetrahydrogeraniol | 35 |
| Total | 1000 |

Fragrance mixtures no. 1 through 4 were tested in a block tablet, prepared as described above, at a 5.00% level, by weight, employing DANTOCHLOR® RW powder as the bleaching agent. Table 2, set out below, summarizes the results of the odor and color observations of the tablets after storage for two weeks, at room temperature, and at 110° F.

TABLE 2

| | 2 weeks Room Temperature | | 2 weeks 110° F. | |
|---|---|---|---|---|
| Component | Color | Odor | Color | Odor |
| No fragrance | 0 | A | 0 | B |
| Mixture 1 | 0 | B | + | C |
| Mixture 2 | 0 | A | 0 | B |
| Mixture 3 | 0 | A | 0 | C |
| Mixture 4 | 0 | A | 0 | B |

Color Stability
++++ = Severe intense discoloration
+++ = Considerable discoloration
++ = Moderate discoloration
+ = Slight discoloration
0 = Essentially no color change relative to unfragranced base
Odor Stability
A = Stable
B = Acceptably stable, slight change
C = Less stable, not disagreeable
D = Unstable, "off" note When 1,3-dibromo-5,5-dimethylhydantoin was substituted for 1,3-dichloro-5,5-dimethylhydantoin, the results of the stability testing showed that a fragrant mixture of eucalyptol/fenchyl acetate mixture was relatively stable at room temperature but lost some of its piney odor character at 90° F., although it was still recognizable as a pine-note. A slightly yellow discoloration was also noted. At 100° F. and 110° F., the piney odor completely disappeared and the 1,3-dibromo-5,5-dimethylhydantoin tablets showed a strong yellow discoloration.

The invention being thus described, it will be obvious that the same may be varied in many ways. Such variations are not to be regarded as a departure from the spirit and scope of the invention and all such modifications are intended to be included within the scope of the following claims.

I claim:

1. A shaped stable, fragrant bleaching block comprising a composition which comprises:

(a) a bleaching agent having a reduction potential from about −0.7 v to about +0.4 v compared to an Ag/AgCl electrode; and (b) an organoleptic effective amount of a fragrant agent which (i) is stable to the bleaching agent; (ii) does not decompose the bleaching agent; and (iii) is not substantially hygroscopic, wherein the fragrant agent has an odor value of C or better when stored in a bleaching composition for two weeks at 110° F. and with the proviso that the fragrant agent is not an essential oil, extract, resin, synthetic oil, or polycyclic compound.

2. The composition according to claim 1, wherein the bleaching agent has a reduction potential from about −0.4 v to about +0.2 v.

3. The composition according to claim 2, wherein the bleaching agent has a reduction potential from about −0.2 v to about +0.1 v.

4. The composition according to claim 1, further comprising a carrier.

5. The composition according to claim 1, wherein the bleaching agent is a halogenated hydantoin.

6. The composition according to claim 5, wherein the bleaching agent is selected from the group consisting of dichlorodimethylhydantoin and bromochlorodimethylhydantoin.

7. The composition according to claim 6, wherein the bleaching agent is dichlorodimethylhydantoin.

8. The composition according to claim 1, wherein the fragrant agent has an odor value of B or better.

9. The composition according to claim 8, wherein the fragrant agent has an odor value of B or better and is selected from the group consisting of Iso amyl phenyl ether, Isoborneol, Isoborneol methyl ether, 2,2-Dimethylbicyclo [2.2.1]heptane-3-carboxylic acid, methyl ester, 2-Tertiary pentyl cyclohexanyl acetate, 7-Octen-2-ol-2,6-dimethyl acetate, 1-Methyl-4-isopropyl cyclohexan-8-yl acetate, Tetrahydrogeraniol, 2,6-Dimethylheptan-2-ol, Diphenyl methane, Diphenyl oxide, Eucalyptol, alpha-Fenchyl acetate, 1,3-Dioxane-2,4,6-trimethyl-4-phenyl, 4-Methyl-2-(2-methylpropyl)tetrahydro-2H-pyran-4-ol, Ethyl tricyclo [5.2.1.02,6]decan-2-carboxylate, 2-Methyldecanonitrile, 2-Butyl-4,4,6-trimethyl-1,3-dioxane, 2-Butyl-4,4,6-trimethyl-1,3-dioxane, Limetol, 3,12-Tridecadiene nitrile, Methyl lavender ketone, Octanal dimethyl acetal, Orange flower ether, p-Tertiary butyl cyclohexanol, Benzene pentanol, gamma-Methyl, 3-octanol, 3,7-Dimethyl-3-octanol, 2,6-Dimethyl-2-octanol, Thymyl methyl ether, ortho-Tertiary butyl cyclohexanyl acetate, Benzene, [2-(1-ethoxyethoxy) ethyl-1-ethoxy-1-(2-phenylethoxy)ethane, Cyclohexyl phenyl ethyl ether, 1-(4-isopropylcyclohexyl) ethanol, and Bicyclo[2.2.1]heptane-2-ethyl-5(or 6)-methoxytricyclo[2.2.1.0.2.6]heptane, 1-ethyl-3-methoxy.

10. The composition according to claim 1, wherein the fragrant agent is present in an amount from about 1% to about 10%, by weight.

11. The composition according to claim 10, wherein the fragrant agent is present in an amount from about 2% to about 8%, by weight.

12. The composition according to claim 1, further comprising a diluent.

13. The composition according to claim 12, wherein the diluent is Isopar M.

14. The composition according to claim 1, wherein the fragrant agent has an odor value of C or better and is selected from the group consisting of Iso amyl phenyl ether, Isoborneol, Isoborneol methyl ether, 2,2-Dimethylbicyclo [2.2.1]heptane-3-carboxylic acid, methyl ester, 2-Tertiary pentyl cyclohexanyl acetate, 7-Octen-2-ol-2,6-dimethyl acetate, 1-Methyl-4-isopropyl cyclohexan-8-yl Acetate, Tetrahydrogeraniol, 2,6-Dimethylheptan-2-ol, Diphenyl methane, Diphenyl oxide, Eucalyptol, alpha-Fenchyl acetate, 1,3-Dioxane-2,4,6-trimethyl-4-phenyl, 4-Methyl-2-(2-methylpropyl)tetrahydro-2H-pyran-4-ol, Ethyl tricyclo [5.2.1.02,6]decan-2-carboxylate, 2-Methyldecanonitrile, 2-Butyl-4,4,6-trimethyl-1,3-dioxane, 2-Butyl-4,4,6-trimethyl-1,3-dioxane, Limetol, 3,12-Tridecadiene nitrile, Methyl lavender ketone, Octanal dimethyl acetal, Orange flower ether, p-Tertiary butyl cyclohexanol, Benzene pentanol, gamma-Methyl, 3-octanol, 3,7-Dimethyl-3-octanol, 2,6-Dimethyl-2-octanol, Thymyl methyl ether, ortho-Tertiary butyl cyclohexanyl acetate, Benzene, 2-(1-ethoxyethoxy)ethyl-1-ethoxy-1-(2-phenylethoxy)ethane, Cyclohexyl phenyl ethyl ether, 1-(4-Isopropylcyclohexyl) ethanol, and Bicyclo2.2.1]heptane-2-ethyl-5 (or 6)-methoxytricyclo[2.2.1.0.2.6]heptane, 1-ethyl-3-methoxy.

15. The composition according to claim 14, wherein the fragrant agent comprises a mixture of at least two members selected from the group.

16. The composition according to claim 15, wherein the fragrant agent comprises a mixture of at least three members selected from the group.

17. The composition according to claim 15, wherein the fragrant agent comprises a mixture of the following components in the proportions set out below:

| Ingredient Name | Quantity |
|---|---|
| 2,2-Dimethylbicyclo[2.2.1]heptane-3-carboxylic acid, methyl ester | 2 |
| 7-Octen-2-ol-2,6-dimethyl acetate | 100 |
| 1-Methyl-4-isopropyl cyclohexan-8-yl acetate | 300 |
| 2,6-Dimethylheptan-2-ol | 30 |
| Diphenyl oxide | 10 |
| Eucalyptol | 50 |
| *alpha*-Fenchyl acetate | 50 |
| 4-Methyl-2-(2-methylpropyl)tetrahydro-2H-pyran-4-ol | 25 |
| Ethyl tricyclo[5.2.1.02,6]decan-2-carboxylate | 2.5 |
| 2-Butyl-4,4,6-trimethyl-1,3-dioxane | 50 |
| Isoborneol | 3.5 |
| Isoborneol methyl ether | 25 |
| Isopar M | 50 |
| Methyl lavender ketone | 5 |
| Octanal dimethyl acetal | 7 |
| Tetrahydrogeraniol | 30 |
| 3,7-Dimethyl-3-octanol | 200 |
| *ortho*-Tertiary butyl cyclohexanyl acetate | 60 |
| Total | 1000 |

18. The composition according to claim 15, wherein the fragrant agent comprises a mixture of the following components in the proportions set out below:

| Ingredient Name | Quantity |
|---|---|
| 7-Octen-2-ol-2,6-dimethyl acetate | 150 |
| 1-Methyl-4-isopropyl cyclohexan-8-yl acetate | 150 |
| Tetrahydrogeraniol, 2,6-dimethylheptan-2-ol | 150 |
| Diphenyl oxide | 15 |
| 1,3-Dioxane-2,4,6-trimethyl-4-phenyl | 25 |
| Ethyl tricyclo[5.2.1.02,6]decan-2-carboxylate | 18 |
| Limetol | 10 |
| Octanal dimethyl acetal | 10 |
| 2,6-Dimethyl-2-octanol | 400 |
| Thymyl methyl ether | 2 |
| *ortho*-Tertiary butyl cyclohexanyl acetate | 70 |
| Total | 1000 |

19. The composition according to claim 15, wherein the fragrant agent comprises a mixture of the following components in the proportions set out below:

| Ingredient Name | Quantity |
|---|---|
| Iso amyl phenyl ether | 15 |
| 2,2-Dimethylbicyclo[2.2.1]heptane-3-carboxylic acid, methyl ester | 5 |
| 2-Tertiary pentyl cyclohexanyl acetate | 25 |
| 7-Octen-2-ol-2,6-dimethyl acetate | 400 |
| Diphenyl methane | 15 |
| Eucalyptol | 15 |
| *alpha*-Fenchyl acetate | 100 |
| Isobornyl methyl ether | 200 |
| 3,7-Dimethyl-3-octanol | 150 |
| *ortho*-Tertiary butyl cyclohexanyl acetate | 65 |
| [2-(1-Ethoxyethoxy) ethyl-1-ethoxy-1-(2-phenylethoxy)ethane | 10 |
| Total | 1000 |

20. The composition according to claim 15, wherein the fragrant agent comprises a mixture of the following components in the proportions set out below:

| Ingredient Name | Quantity |
|---|---|
| Diphenyl methane | 350 |
| Eucalyptol | 450 |
| Ethyl tricyclo[5.2.1.02,6]decan-2-carboxylate | 25 |
| Isopar M | 115 |
| Octanal dimethyl acetal | 25 |
| Tetrahydrogeraniol | 35 |
| Total | 1000 |

21. The composition according to claim 1, further comprising an additive selected from the group consisting of a solubility modifier, a compaction aid, a filler, a surfactant, a dye, a dispersant, a binder, a lubricant/mold release agent, a detergent builder, a corrosion inhibitor, a chelant, a stabilizer, a biocide, a bromide source, and an oxidizing halogenated biocide.

22. The composition according to claim 21, wherein the bleaching agent is a composition containing approximately eighty percent 1,3-dichloro-5,5-dimethylhydantoin and twenty percent 1,3-dichloro-5,5-methylethylhydantoin.

23. The composition according to claim 22, wherein the additive is a binder.

24. The composition according to claim 23, wherein the binder is ethylene-bis-stearamide.

25. The composition according to claim 21, wherein the shaped fragranced bleaching block is a tablet, briquette, granule, pellet, or dispenser.

26. The composition according to claim 25, wherein the shaped fragranced bleaching block is a urinal block.

27. A method for preparing a stable, fragrant bleaching composition which comprises admixing:

(a) a bleaching agent having a reduction potential from about −0.7 v to about +0.4 v compared to an Ag/AgCl electrode; and (b) an organoleptic effective amount of a fragrant agent which (i) is stable to the bleaching agent; (ii) does not decompose the bleaching agent; and (iii) is not substantially hygroscopic, wherein the fragrant agent has an odor value of C or better when stored in a bleaching composition for two weeks at 110° F. and with the proviso that the fragrant agent is not an essential oil, extract, resin, synthetic oil, or polycyclic compound.

* * * * *